July 17, 1923.

H. J. LA WALL ET AL 1,462,140

SYSTEM OF BOOKKEEPING

Filed Jan. 6, 1922

4 Sheets-Sheet 1

*Fig. 1.*

| DAILY CASH BALANCE SLIP | | | | | | | |
|---|---|---|---|---|---|---|---|
| DEPARTMENT | A | B | C | D | E | F | |
| CASH SALES: | | | | | | | |
| a | Cash in cash drawer (less change) | | | | | | |
| b | Cash paid out for Petty Expenses | | | | | | |
| c | Cash paid out for Mdse. Returned | | | | | | |
| d | Total (a+b+c) | | | | | | |
| e | Less Cash Rec'd on Acct. of Charge Sales | | | | | | |
| f | Gross Cash Sales for Day (d+e) | | | | | | |
| g | Less Cash Paid out for Mdse. Returned (c) | | | | | | |
| h | Net Cash Sales for Day (f-g) | | | | | | |
| CHARGE SALES: | | | | | | | |
| i | Gross Charge Sales | | | | | | |
| j | Less Charge Sales Returned | | | | | | |
| k | Net Charge Sales for Day (i-j) | | | | | | |
| l | Total Sales for Day (h+k) | | | | | | |

*Fig. 2.*

| | | | | DEDUCTIONS | | | | | |
|---|---|---|---|---|---|---|---|---|---|
| Day to Pay for Discount | NAME OF FIRM | DATE of INVOICE | GROSS AMOUNT of INVOICE | FREIGHT EXPRESS | MDSE. RETURNED | DISCOUNT | NET AMOUNT PAID | CHECK NO. | DATE PAID |

INVOICE RECORD    No.........

INVENTORS
Harold J. La Wall,
Charles E. Wetzel
BY Blount, Moulton & Holbrook
ATTORNEYS July 17, 1923.

H. J. LA WALL ET AL 1,462,140

SYSTEM OF BOOKKEEPING

Filed Jan. 6, 1922

4 Sheets-Sheet 2

INVENTORS
Harold J. LaWall,
Charles E. Wetzel.
BY
ATTORNEYS

July 17, 1923.

H. J. LA WALL ET AL 1,462,140

SYSTEM OF BOOKKEEPING

Filed Jan. 6, 1922

4 Sheets-Sheet 3

*Fig. 4.*

MONTHLY RECORD

INVENTORS
Harold J. LaWall,
Charles E. Wetzel

BY

ATTORNEYS

July 17, 1923.

H. J. LA WALL ET AL 1,462,140

SYSTEM OF BOOKKEEPING

Filed Jan. 6, 1922

4 Sheets-Sheet 4

Fig. 5.

INVENTORS
Harold J. La Wall,
Charles E. Wetzel.
BY
ATTORNEYS

Patented July 17, 1923.

1,462,140

UNITED STATES PATENT OFFICE.

HAROLD J. LA WALL AND CHARLES E. WETZEL, OF PHILADELPHIA, PENNSYLVANIA.

SYSTEM OF BOOKKEEPING.

Application filed January 6, 1922. Serial No. 527,311.

*To all whom it may concern:*

Be it known that we, HAROLD J. LA WALL and CHARLES E. WETZEL, citizens of the United States, residing in Philadelphia, county of Philadelphia, State of Pennsylvania, have invented certain new and useful Improvements in Systems of Bookkeeping, of which the following is a specification, reference being had therein to the accompanying drawings.

Our invention relates to a system of bookkeeping comprising a series of forms which may be printed or otherwise reproduced and embodied in bound books or loose leaf binders and constitute a complete record of the daily transactions, with monthly and yearly summaries, whereby comparisons may be made at a glance and the status of the business ascertained at any time.

A principal object of our invention is to provide a system of bookkeeping particularly adapted for use by retail merchants or in small businesses, characterized by simplicity in use and not requiring a skilled knowledge of bookkeeping whereby the services of a bookkeeper may be dispensed with, thus effecting a desirable economy in the operation expense of the small merchant.

A further object of our invention is to provide a simple and complete cash system of bookkeeping embodying forms new and original in their design, substantially self-explanatory in their use, and which may be kept by the merchant or an employee even if they do not have the knowledge of bookkeeping usually required in the conduct of a business.

A further object of our invention is to provide a simplified system of bookkeeping in which the same results may be obtained as from the use of a set of double entry books.

A further object of our invention is to provide in a system of bookkeeping a set of new and original forms so arranged that the daily transactions or the aggregate of the daily transactions to any day of any month, the monthly transactions or the aggregate transactions of any number of months, a comparison of the months' business during a current year or with the corresponding month of a previous year, the profit for the year, and the statement of assets and liabilities for the fiscal year may each be ascertained at a single glance and without requiring the turning of pages or referring to numerous books.

A further object of our invention is to provide a system of bookkeeping whereby the preparation of income tax or other government tax returns may be accomplished with a minimum of effort and with accuracy.

A further object of our invention is to provide a system of bookkeeping in which the keeping of the "cash book" and the "ledger" of the double entry system of bookkeeping is eliminated.

A further object of our invention is to provide a system of bookkeeping in which by simply referring to a single page or two facing pages the proprietor or manager of the business may instantly ascertain all the facts concerning the business that are essential to a detailed analysis at any time.

Other useful and advantageous objects of our invention will appear hereinafter.

In the drawings, Fig. 1 is a representation of a "Daily cash balance slip" utilized in our system; Fig. 2 is a representation of the "Invoice record"; Fig. 3 is a representation of the "Daily record" which may be embodied on a single page or, for the purposes of convenience, on two facing pages by folding or otherwise; Fig. 4 is a representation of the "Monthly record" which may also be embodied either on a single page or on two facing pages; Fig. 5 is the "Yearly summary" which likewise may be embodied on a single page or two facing pages. Preferably each of these five forms which are utilized in our system of bookkeeping are separately bound either in books or loose leaf binders or they may be placed in suitable files.

Referring to Fig. 1 of the drawing, the "Daily cash balance slip," this form is used as an original record of sales and in balancing the cash register or drawers at the end of the day. It comprises a plurality of vertical columns at the top of which are the letters A, B, etc. each column being for a division or department of the business, for example, the business of a retail drug store might be divided into Department A, prescriptions; Department B, general merchandise; Department C, soda fountain; Department D, cigars; Department E, confectionery, and Department F, stationery; it will be understood that the number of departments may be arbitrarily determined for any particular business or the division of the business into departments entirely dispensed with if only the total sales is desired. Horizontal lines intersecting the said vertical lines form appropriate spaces in which the transactions in each department may be entered, the different transactions being appropriately entitled in the spaces at the left hand side of the slip with reference letters substantially the same as those illustrated, such as, $a$, "cash in cash drawer," $b$, "cash paid out for petty expenses," etc., the items or titles representing the steps necessary to balance the cash register or cash drawers at the end of the day. The spaces also provide for entry of data vital to a business record, such as "cash sales," "charge sales," "cash received on account of charge sales" and other important data and information substantially as illustrated. This "Daily cash balance slip" constitutes a record of original entry, certain of the items being transferred therefrom to the "Daily record" as hereinafter described.

Referring to Fig. 2 of the drawing, a representation of the "Invoice record" is therein made which provides means of making a complete record of all invoices including "Date to pay for discount," "Name of firm issuing invoice," "Date of invoice," "Gross amount," "Deductions," "Net amount paid," "Check No." and "Date paid" substantially as illustrated. The "Invoice record" comprises a plurality of vertical columns intersected by a plurality of horizontal lines thereby forming spaces for the proper entries to be made of the items as will be clear from the drawing. By scanning the first column, "Date to pay for discount," each day it can be readily seen which bills should be paid in order to earn the extra profit in the form of discount. At the end of the fiscal year when the "Yearly summary" is completed, the "Invoice record" will show all unpaid invoices which enables the net profit to be readily ascertained.

The form entitled "Daily record" represented in Fig. 3 consists of a plurality of vertical columns appropriately headed substantially the same as shown, "1 Net cash sales (line $h$)," "2 Net charge sales (line $k$)" and "3 Total net sales (line $l$)," the terms "line $h$," "line $k$" and "line $l$" indicating that the amounts entered opposite lines $h$, $k$ and $l$ on the "Daily cash balance slip" are to be entered in the "Daily record" in the appropriate spaces. These vertical columns 1, 2 and 3 of the "Daily record" are intersected by horizontal lines which form ruled spaces opposite the designations A, B, C, D, E and F, being the designation of the different departments as found on the "Daily cash balance slip" and as hereinabove described. A heading or title "Other cash receipts" is provided beneath which, in the spaces provided, may be entered all cash received during the day from other sources than those provided for by the items already appearing on this form, for example, miscellaneous income such as interest on bank balances, dividends, rents, investments, which may be entered in the spaces provided with a short description so that the items may be identified later if necessary; the total of the item entered on line "H" under the heading "Other cash receipts," being the amount received on account of charge sales, is the total of all the amounts entered on line ($e$) of the "Daily cash balance slip." Space is also provided, as will be seen on the drawing, for recording the number of customers for each day and the average sale to each which is ascertained by dividing the total of column 3 line "G" by the number of customers and under "Remarks" may be entered a record of the weather for the day (which is useful in analyzing the figures to explain the day of low receipts) or anything else of unusual character that affected the sales.

Columns 5–19 on the right hand side of the "Daily record" have appropriate headings substantially the same as shown comprising a standard and accepted classification of accounts for retail business, such as "Mdse.", "Rent", "Taxes", "Heat", etc., the upper half of the columns showing "Distribution of petty cash expenditures for the day" and the lower half of the columns showing "Distribution of checks issued for the day". Suitable space is provided under the heading "Description" in which may be entered in detail each expenditure by cash or check and the total amount of the item in column 4. The expenditure is then classified by carrying the amount out in the proper column of columns 5–19 on the right.

After all the entries have been made for the day under "Petty cash expenditures" and "Checks issued" and the totals added, and entered opposite lines "J" and "K" respectively, the aggregate sum is entered opposite line "L"; thus there will appear on one page or two facing pages in classified form, the total amount paid out for the day and at the same time the entries described eliminate the necessity of making any entries on the check stubs, a column being provided in the "Daily record", as will be seen, for entry of the check numbers issued, suitable space also being provided under the heading "Description" for entering the names of the payees of the checks.

All the columns on the "Daily record" are numbered, reference being made to them by their number in the "Monthly record" as described hereinafter.

Provision is also made in the lower left hand corner of the "Daily record" for balancing the cash and bank accounts, the manner and place of making the entries being indicated by the use of appropriate wording, letters and figures substantially as shown, such as "Bank deposits for day," "Total checks issued," "Total cash on hand end of day," etc. The cash balance on line 7 plus the bank balance on line 12 gives, on line 13, the total of all cash on hand, whether it be in the register, safe or bank, and keeps the proprietor constantly advised in this important item of his business.

This "Daily record" as will be seen, comprises a complete record of all transactions of a day's business.

In Fig. 4 is represented the "Monthly record," a summary of the "Daily record" entries, and consisting of a plurality of vertical columns, each being numbered, having an appropriate heading substantially the same as those illustrated, a series of lines intersecting the vertical lines forming spaces for the entry of items.

Each column of the "Monthly record" represents an important classification of "Sales," "Cash receipts," and "Cash expenditures" all entries being made on this sheet by transferring the total for each day from the "Daily record," a note in each column indicating which figures are to be transferred to that column from the "Daily record" thus making the entries self-explanatory; for example, the heading of column 8 in the "Monthly record" reads "Total net charge sales from daily record Col. 2 Line G" indicating that the amount to be entered in this column for any given day is the amount found in the "Daily record," column 2 thereof, line G. Each line entitled "To day" is a complete record of that day's business and each line entitled "To date" is a complete record of the total business of the month to that date. Columns without any heading are provided so that any cash receipts or expenses which may not appropriately fall under the headings provided may be entered therein and an appropriate heading entered at the head of the column.

The total of the columns at the bottom of the sheet therefore constitute a complete record of the month's business, including total sales by all departments, a separate total of the charge sales and cash sales and a record of all cash received and a record of all cash paid out, classified according to standard and accepted accounts.

In Fig. 5 of the drawings is represented the "Yearly summary" in which there is a top portion consisting of a plurality of vertical columns each being numbered and having an appropriate heading corresponding to the numbers and headings of the columns of the "Monthly record" and a series of sub-divisions formed by intersection with horizontal lines; at the left hand side of the form are entered the months of the year, space being provided for the entry in appropriate column opposite each month of the item for that month and provision also being made for adding the total of each month so that at the end of any month the aggregate of the items in any column are entered. The numbered columns in the "Yearly summary" corresponding to the numbered columns of the "Monthly record" makes the transfer of the figures from the latter to the former self-explanatory.

After all the entries have been made on the upper or top portion of the "Yearly summary" as just described, and the columns totaled, the proprietor or merchant has before him at the end of any month on a single page or two facing pages, visible at a single glance, a complete detailed statement of his business by months for study and analysis. The lower portion of the "Yearly summary" is made up of different sections entitled "Monthly summary of accounts receivable," "Summary of cash for year," "Monthly comparisons," "Profit for year" and "Statement of assets and liabilities" substantially the same as those illustrated. These sections are worded, lettered or numbered so that they are self-explanatory and easy to fill in.

The section "Monthly summary of accounts receivable" shows at a glance how much is due from charge customers. The total of the unpaid charge accounts at the beginning of the month is entered on line "A" of this section; entries made on line "B" of the charge sales being the amount in column 8 of the top portion and the total of the entries on lines "A" and "B" are then entered on line "C." On line "D" is entered the amount of cash received on account which is taken from column 10 of the top portion and this amount is subtracted from the total on line "C" giving the amount of the unpaid charge accounts which is entered on line "E." This amount is in turn carried to line "A" of the next month's records and so on.

The section "Summary of cash for year" shows how much cash was on hand at the beginning and end of the year and serves as proof of various entries made during the year on the forms utilized in our system and herein described.

The section on the "Yearly summary" marked "Monthly comparisons" provides means for comparing the monthly sales for the current year and the previous year and the percentage of increase or decrease and for a comparison of the average daily sales for both years. The amounts of the total sales per month are taken from column 7 of the top portion.

The section entitled "Profit for year"

provides for determining the profit or loss for the year, the titles of the entries to be made being so lettered and worded as to make the entries self-explanatory substantially in the manner illustrated.

On line "A" is provision for entering the "Total sales" which is the top of column 7 of the upper portion of the "Yearly summary."

On line "B" is entered the "Inventory first of year"; on line "C," "Unpaid bills or invoices at end of year," which item is taken from the "Invoice record"; on line "D," "Total cash purchases" taken from column 18 of the top portion, the amount having been transferred from column 18 of the "Monthly record" for any particular month, the entry in the "Monthly record" having been ascertained from the "Daily record." On line "E" provision is made for the entry of the total of items B, C and D. On line "F" is entered the "Inventory end of year"; on line "G" the amount of "Unpaid bills or invoices first of year," and on line "H" is entered the total of items entered on lines F and G. Line "I" is for the "Total cost of goods" which is the total of line E less the total of line H.

Line "J" is the "Gross profit" or the difference between lines A and I; line "K" provides for entering the total of all expenses of the business plus "Depreciation for the year" plus "Bad debts charged off during the year" and is the amount entered on the bottom line of column 32 of the upper portion of the "Yearly summary"; line "L" is the "Net profit" or "Net loss" for the year from the operation of the business, and is the difference between lines J and K; line "M" is for entering "Miscellaneous income" such as rent, interests on bank balances, etc., and is the total of column 11 of the upper portion of the "Yearly summary"; line "N" is the "Total net profit" or "Total net loss" for the year, and is the total of lines L and M; line "O" is for entering the proprietor's "Personal withdrawals," which is the total of column 33 of the upper portion of the "Yearly summary," and line "P" is the difference between lines N and O and represents the balance of the profit or loss added to or deducted from the capital invested in the business at the beginning of the year.

Provision is made in the extreme right hand column of this section of the "Yearly summary" for calculating the percentage relation of "Cost of goods," "Total expenses," and "Profit" to "Sales," the total sales being taken at 100%.

The section of the "Yearly summary" headed "Statement of assets and liabilities year ending 19—" substantially in the manner illustrated provides debit and credit columns with standard accounts provided for and spaces for entering assets or liabilities not covered by the standard accounts, means thus being provided for assembling and recording all the assets and liabilities.

This "Yearly summary" as will now be seen, embodies on a single page, or if desired on two facing pages, a summary of all transactions of a year's business together with information enabling monthly comparisons of the business to be made instantly both for the current year and with the previous year, and also comparison to be made of the total yearly business with that of the previous year. The entries made on the "Yearly summary" are derived from entries obtained by the conjoint, cooperative and interlocking use of the "Daily cash balance slip", "Invoice record", "Daily record" and "Monthly summary", all five of the forms herein described and illustrated in the drawings as embodying means for carrying out our improved system of bookkeeping being essential and necessary elements of the system, although each of these new and original forms of our invention might, if desired, be used as a distinct and separate unit independent of the other forms.

It will be apparent that our improved system of bookkeeping is adaptable for all kinds of business and that changes and modifications could be made therein to suit the needs of a particular business without departing from the spirit and scope of our invention.

Having thus described our invention, we claim and desire to protect by Letters Patent of the United States:—

1. In a system of bookkeeping, the combination of a daily cash balance sheet suitably ruled and appropriately designated to provide departmental columns with spaces for entry of designated cash and charge transactions occurring in each department; an invoice record sheet suitably ruled and with appropriate headings for the entry of invoice data thereon; a daily record sheet comprising a plurality of numbered, suitably ruled columns and headings therefor designating the particular account in which the expenditures for the day are to be entered, said daily record sheet also comprising a section suitably ruled, lettered and numbered for transfer thereto of the departmental transactions in summarized form from the daily cash balance record, suitable spaces with appropriate titles also being provided for balancing the cash and bank account at the end of each day; a monthly record sheet suitably ruled and designated for transfer thereto of items from the daily record sheet, a column containing the dates of the month being provided at one end of the sheet so that the entries for each day may be properly entered opposite its date, said monthly record sheet constituting a statement of all transactions for each day for a full month of the business; and a yearly summary sheet having an upper portion divided by suitable ruling into columns corresponding by number and heading to the columns of the monthly record sheet, the names of the months appearing in a column at the end of the sheet, opposite to which in the space provided therefor may be entered the item in the proper column as transferred from the monthly record, said yearly summary sheet also comprising sections suitably ruled and entitled "Monthly summary of accounts receivable," "Monthly comparison," "Summary of cash for the year," "Profit for year," and "Statement of assets and liabilities for year," suitable and self-explanatory directions and titles being provided in the sections to enable the proper entries to be made therein as ascertained from said upper portion of the yearly summary, the monthly record and the invoice record.

2. In a system of bookkeeping, the combination of a daily cash balance sheet suitably delineated and provided with headings to enable all the cash and charge transactions of the day to be properly classified therein and the cash balanced at the end of the day, being a record of original entry; an invoice record sheet suitably delineated and designated for the entry of data relating to invoices; a daily record sheet suitably delineated and provided with headings and titles whereby a complete record of all transactions of a day's business may be appropriately entered and classified from the daily cash balance sheet and invoice record sheet; a monthly record sheet suitably delineated and provided with designating headings and titles whereby the summary of each day's business of the month may be classified and entered from the daily record sheet and a complete record of the month's business recorded; and a yearly summary sheet suitably delineated into appropriately designated sections, columns and divisions whereby a complete record of each month's transactions may be classified and entered thereon from the monthly record and invoice record and a complete record of the year's business obtained, the entries on each of said sheets being instantly visible as shown and described.

In witness whereof, we have hereunto set our hands this 31st day of December, 1921.

HAROLD J. LA WALL.
CHARLES E. WETZEL.